(12) United States Patent
Morimoto

(10) Patent No.: US 10,185,520 B2
(45) Date of Patent: Jan. 22, 2019

(54) INFORMATION PROCESSING APPARATUS AND METHOD FOR INFORMATION PROCESSING APPARATUS FOR EXECUTING PRINT DRIVER MAINTENANCE OPERATIONS

(71) Applicant: CANON KABUSHIKI KAISHA, Tokyo (JP)

(72) Inventor: Hiroaki Morimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 63 days.

(21) Appl. No.: 15/048,847

(22) Filed: Feb. 19, 2016

(65) Prior Publication Data

US 2016/0170691 A1   Jun. 16, 2016

Related U.S. Application Data

(63) Continuation of application No. 13/759,477, filed on Feb. 5, 2013, now abandoned.

(30) Foreign Application Priority Data

Feb. 15, 2012   (JP) ................................. 2012-030815

(51) Int. Cl.
*G06F 3/12* (2006.01)
*G06F 3/0484* (2013.01)
*G06F 3/0482* (2013.01)
*G06F 11/07* (2006.01)

(52) U.S. Cl.
CPC .......... *G06F 3/1209* (2013.01); *G06F 3/0482* (2013.01); *G06F 3/04842* (2013.01); *G06F 3/126* (2013.01); *G06F 3/1225* (2013.01); *G06F 3/1227* (2013.01); *G06F 3/1284* (2013.01); *G06F 3/1294* (2013.01); *G06F 11/0733* (2013.01); *G06F 11/0766* (2013.01)

(58) Field of Classification Search
CPC ...... G06F 3/1209; G06F 3/126; G06F 3/1225; G06F 3/04842; G06F 3/0482; G06F 11/0766; G06F 11/0733; G06F 3/1284; G06F 3/1227; G06F 3/1294
USPC ........................................................ 358/1.14
See application file for complete search history.

(56) References Cited

U.S. PATENT DOCUMENTS

| | | | | |
|---|---|---|---|---|
| 2002/0152430 A1* | 10/2002 | Akasaka | ............. | G06F 11/1471 714/43 |
| 2003/0137687 A1* | 7/2003 | Onuma | ................. | G06F 3/1287 358/1.14 |
| 2005/0024497 A1* | 2/2005 | Sakamoto | .......... | H04N 1/00278 348/207.2 |

(Continued)

*Primary Examiner* — Allen H Nguyen
(74) *Attorney, Agent, or Firm* — Canon USA Inc., IP Division

(57) ABSTRACT

An information processing apparatus connected to a printing apparatus includes a database configured to associate and manage a command identifier and a maintenance command, an acquisition unit configured to acquire from the database the maintenance command corresponding to a command identifier designated by an application and acquired via a spooler according to a port monitor that functions based on an expansion file, and a transmission unit configured to transmit the acquired maintenance command to the printing apparatus according to the port monitor that functions based on the expansion file.

24 Claims, 16 Drawing Sheets

(56) References Cited

U.S. PATENT DOCUMENTS

2006/0259549 A1* 11/2006 Huang ............... G06K 15/00
                                                709/203
2007/0019214 A1*  1/2007 Saito ................. B41J 3/46
                                                358/1.1
2008/0244435 A1* 10/2008 Takei ............... G06F 3/1204
                                                715/771

* cited by examiner

INFORMATION PROCESSING APPARATUS AND METHOD FOR INFORMATION PROCESSING APPARATUS FOR EXECUTING PRINT DRIVER MAINTENANCE OPERATIONS

CROSS-REFERENCE TO RELATED APPLICATIONS

This application is a Continuation of U.S. patent application Ser. No. 13/759,477 filed on Feb. 5, 2013, which claims the benefit of Japanese Patent Application No. 2012-030815 filed Feb. 15, 2012. These applications are hereby incorporated by reference herein in their entirety.

BACKGROUND OF THE INVENTION

Field of the Invention

The present invention relates to a technology for executing a maintenance operation based on next-generation printer driver architecture.

Description of the Related Art

Conventionally, as discussed in Japanese Patent Application Laid-Open No. 2006-12037, a printer driver based on legacy architecture (hereinafter referred to as a legacy driver) has been able to transmit a maintenance command instructing execution of a maintenance operation, such as nozzle cleaning, to a printer as a print job.

For a legacy driver, a maintenance command transmission button is provided on a user interface (hereinafter referred to as a UI), and a maintenance command is transmitted as a print job when the user presses that button. Alternatively, when an external application is utilized, the user selects an arbitrary printer on an external graphical user interface (hereinafter referred to as a GUI), and then when the user presses a button that instructs the maintenance command to be transmitted, a maintenance command is transmitted as a print job.

Recently, new operating systems (hereinafter referred to as OSes) have been developed that also handle mobile personal computers (PCs) in addition to desktop PCs. Applications, printer drivers, and the like need to support the next-generation architecture that is contained in these new OSes. Naturally, such new OSes are likely to include several restrictions, which may prevent conventional maintenance methods from being properly executed with the applications and printer drivers that operate on these OSes.

SUMMARY OF THE INVENTION

The present invention is directed to an information processing apparatus that properly transmits an instruction to execute a maintenance operation to a printer even with a restriction.

According to an aspect of the present invention, an information processing apparatus connected to a printing apparatus includes a database configured to associate and manage a command identifier and a maintenance command, an acquisition unit configured to acquire from the database the maintenance command corresponding to a command identifier designated by an application and acquired via a spooler according to a port monitor that functions based on an expansion file, and a transmission unit configured to transmit the acquired maintenance command to the printing apparatus according to the port monitor that functions based on the expansion file.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
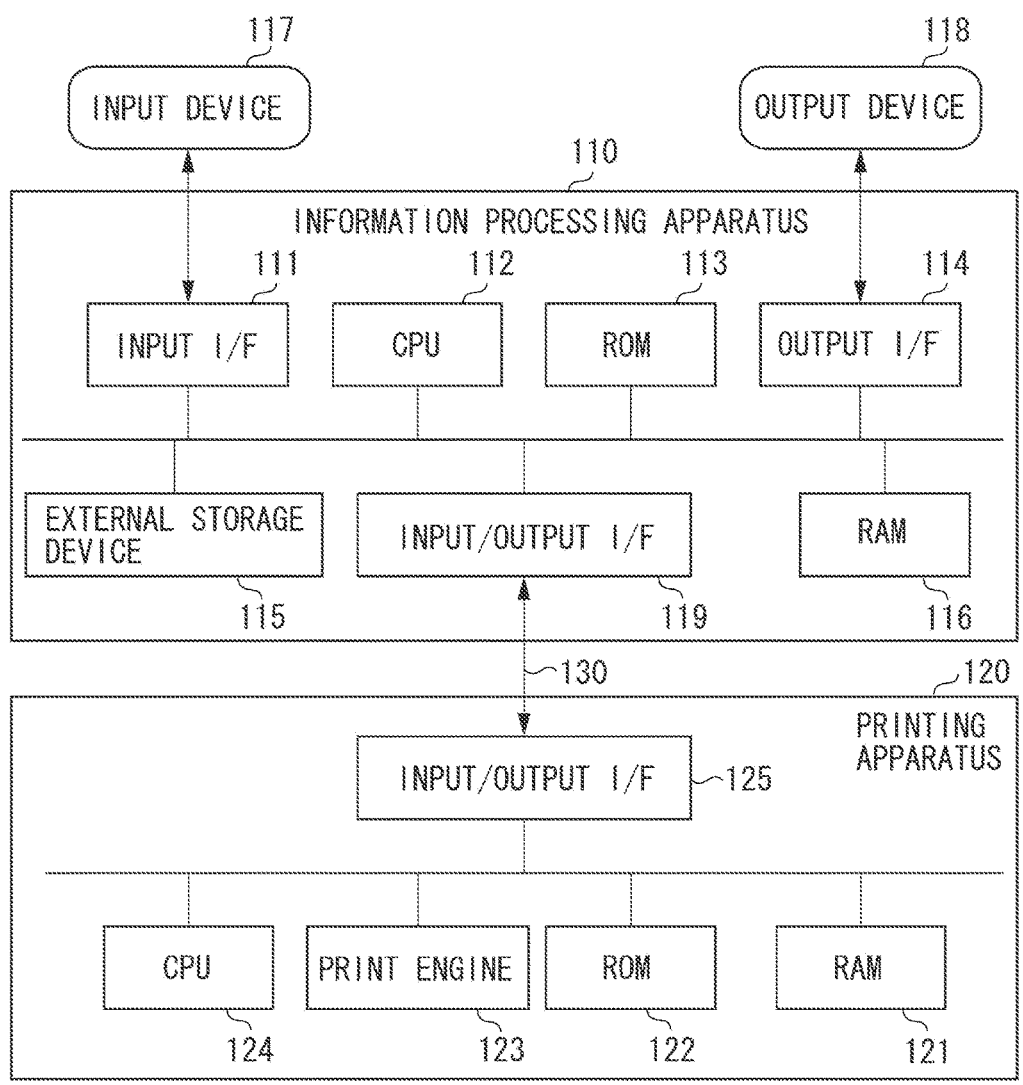
FIG. 1 is a block diagram illustrating a printing system in which a printing apparatus and an information processing apparatus are connected.

FIG. 1 is a block diagram illustrating an example of the overall configuration of a printing system configured from an information processing apparatus 110 and a printing apparatus 120 connected to the information processing apparatus 110. The information processing apparatus 110 includes an input interface (I/F) 111, a central processing unit (CPU) 112, a read-only memory (ROM) 113, an output I/F, an external storage device 115, a random access memory (RAM) 116, an input device 117, an output device 118, and an input/output I/F 119. The ROM 113 stores an initialization program. The external storage device 115 stores programs such as an operating system (OS), printer drivers, and applications. The RAM 116 is used as a work memory by various programs stored in the external storage device 115. The input device 117 is configured as, for example, a mouse, a keyboard, and a touch panel. The input device 117, which is used to input data or operation instructions, is connected to the input I/F 111. The output device 118, which is used to display data or issue a status notification, is connected to the output I/F 114.

The printing apparatus 120 is configured from a RAM 121, a ROM 122, a printer engine 123, a CPU 124, and an input/output I/F 125. The information processing apparatus 110 and the printing apparatus 120 are connected by a Universal Serial Bus (USB) cable 130. The RAM 121 is used as a work memory for the CPU 124, and as a temporary storage buffer for received data. The ROM 122 stores control commands. The printer engine 123 performs printing based on the data stored in the RAM 121. The CPU 124 controls the printing apparatus 120 according to the control commands stored in the ROM 122.

In the present exemplary embodiment, although the processing load of the information processing apparatus 110 and the printing apparatus 120 is illustrated as described above, the processing load is not limited to the above-described mode.

Next, the flow of print data using a printer driver that is based on legacy architecture (hereinafter referred to as a legacy driver), which is a conventional printing system, and the flow of maintenance execution processing executed on that architecture, will be described with reference to FIGS. 2 and 3.

Figure 2:
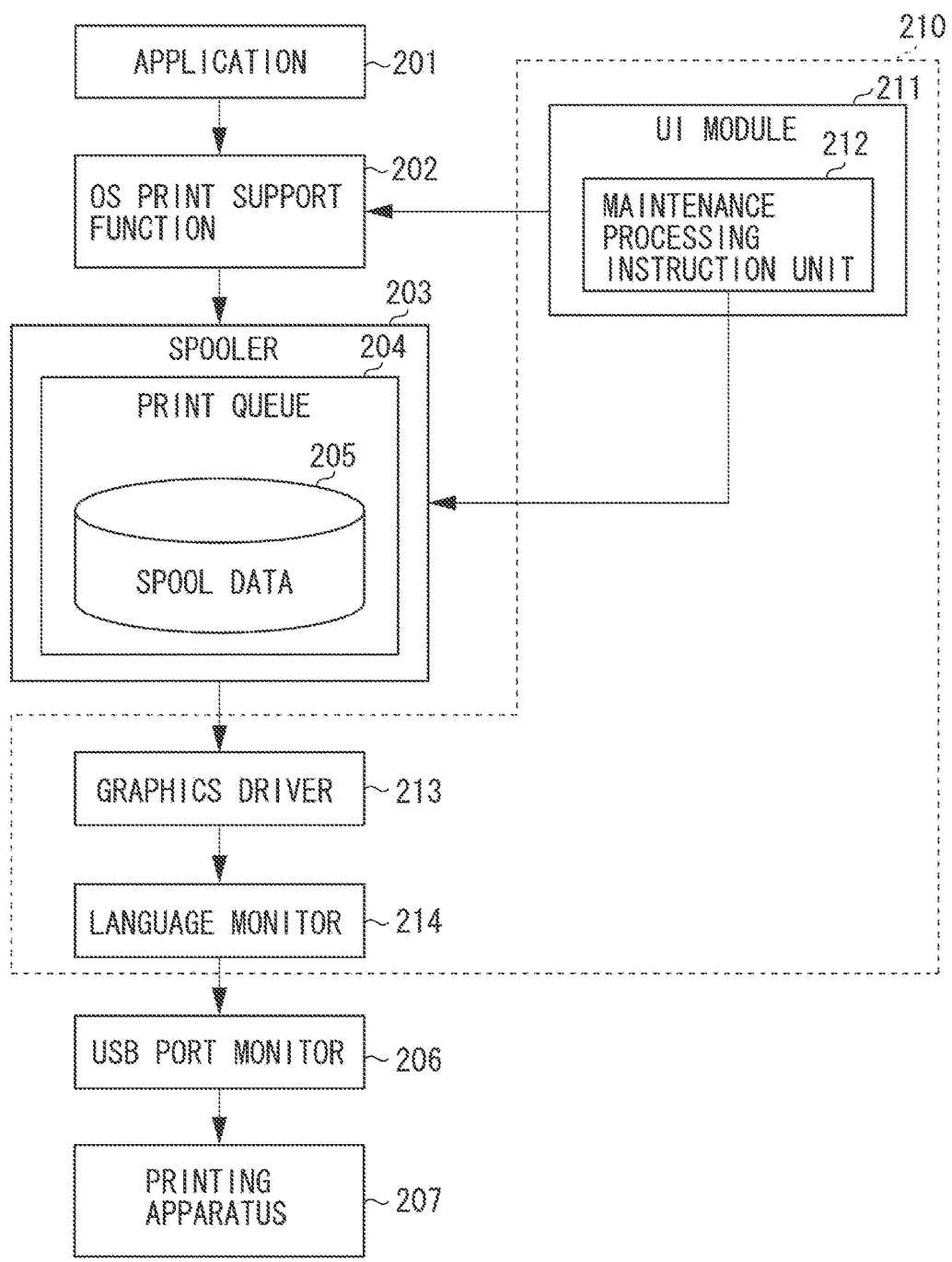
FIG. 2 is a block diagram illustrating a module configuration relating to a printer driver based on legacy architecture.

FIG. 2 schematically illustrates a module configuration relating to the legacy driver, which is a conventional printing system and can be applied in the information processing apparatus 110.

Print setting information returned from a UI module 211 via an OS print support function 202 is added to the print data created by an application 201, and the resultant data is temporarily stored in a print queue 204 of a spooler 203 as spool data 205. The spool data 205 is converted into a print command that can be interpreted by a printing device 207 (which has the same configuration as the printing apparatus 120) by a legacy driver 210, and the converted data is then output to a USB port monitor 206. The legacy driver 210 is configured from modules including the above-described UI module 211, as well as a below-described graphics driver 213 and a language monitor 214. The USB port monitor 206 transmits the input print data to the printing device 207. The UI module 211 can have a maintenance processing instruction unit 212 for issuing a maintenance operation instruction to the printing device 207. The user transmits the maintenance operation instruction to the printing device 207 by selecting a maintenance operation from a UI screen provided by the UI module 211.

Figure 3:
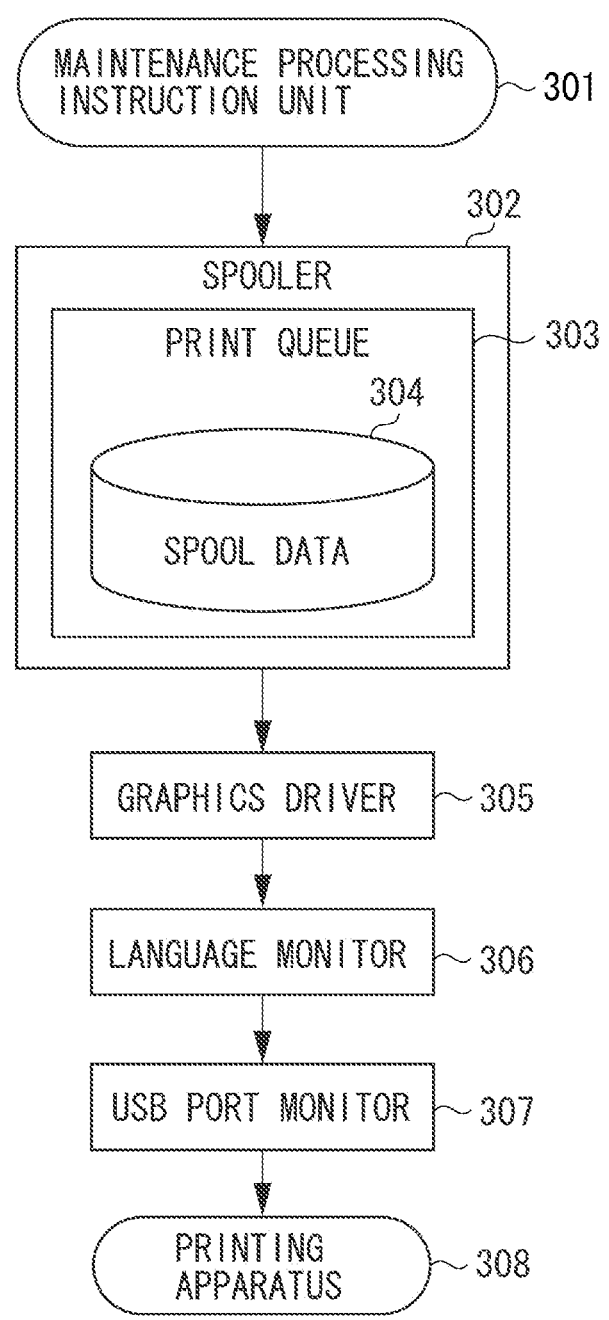
FIG. 3 illustrates the flow of maintenance processing performed by a printer driver based on legacy architecture.

FIG. 3 illustrates the flow of maintenance processing performed by a legacy driver.

A maintenance processing instruction unit 301 (the maintenance processing instruction unit 212 in FIG. 2) included in the UI module 211 generates a maintenance command that can be interpreted by a printing device 308 according to an instruction from the user, and transmits the generated maintenance command to a spooler 302. The spooler 302 temporarily stores the receive maintenance command in a print queue 303 as spool data 304. The spool data 304 is output to a USB port monitor 307 via a graphics driver 305 and a language monitor 306. The maintenance command is in a format that already allows the maintenance command to be interpreted by the printing device when being input into the graphics driver 305. Consequently, the graphics driver 305 does not need to perform the above-described conversion processing on the input maintenance command.

The maintenance processing instruction unit 301 sets information indicating that execution of the above-described conversion processing is unnecessary in the job to be transferred to the spooler 302 according to the maintenance command issuance processing. Based on that information, the graphics driver 305 performs control so that a conversion operation is not executed. Subsequently, the USB port monitor 307 executes the maintenance operation by transmitting the input maintenance command to the printing apparatus 308.

A first exemplary embodiment according to the present invention will now be described with reference to FIGS. 4 to 9. The present exemplary embodiment will be described using an example in which a database used by a printer driver based on below-described next-generation architecture (hereinafter referred to as a next-generation driver) stores a maintenance command group for one model.

Figure 4:
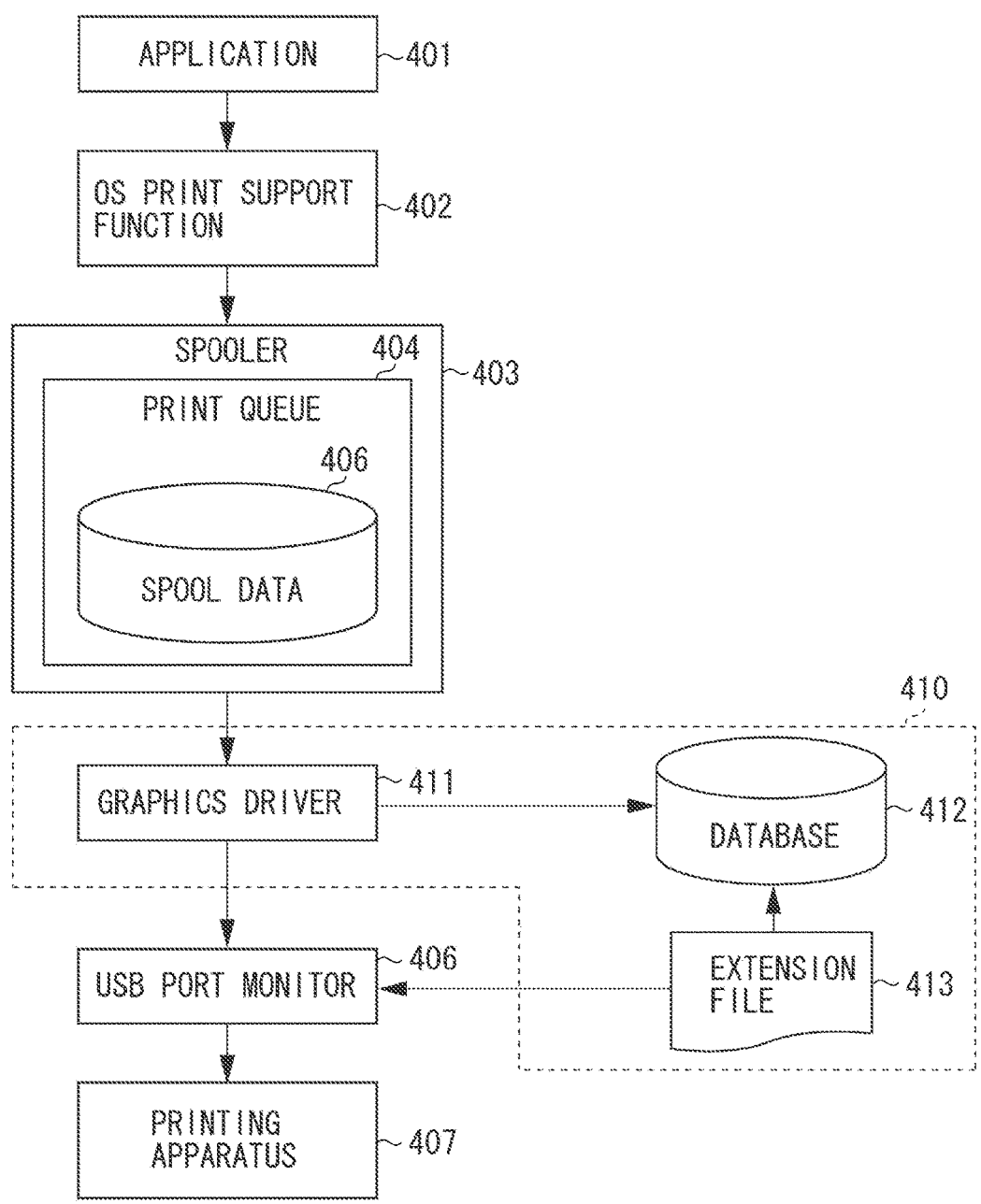
FIG. 4 is a block diagram illustrating a module configuration relating to a printer driver based on next-generation architecture according to a first exemplary embodiment of the present invention.

FIG. 4 schematically illustrates a configuration relating to the next-generation driver, which is a printing system that has a different configuration from that of a legacy driver, which can be applied in the information processing apparatus 110. FIG. 4 illustrates in detail an example of a module configuration in which programs such as an application, a printer driver, and an OS are operated as the main subject of various functions provided when executed by the CPU.

Print data created by an application 401 is temporarily stored in a print queue 404 in a spooler 403 as spool data 405 via an OS print support function 402. The spool data 205 is converted by a graphics driver 411 into a print command that can be interpreted by the printing apparatus 120.

The database 412 utilized by the next-generation driver can be referred to by the graphics driver 411 and a below-described port monitor. The database 412 can store various information that varies depending on the printing apparatus model and maintenance commands.

The graphics driver 411 acquires, from the database 412 utilized by the next-generation driver, the model-dependent information that will be necessary when generating a print command. A file group 410 forms the next-generation driver.

When the graphics driver 411 receives a print request from a common application, the graphics driver 411 acquires from the database 412 an image processing parameter specific to the printing apparatus that is to perform the printing, and generates a print command. The generated print command travels via a USB port monitor 406 to the printing apparatus 407. Printing processing in a printing system that includes the next-generation driver is thus realized.

The printing apparatus vendor provides a next-generation driver installer program for collectively installing the above-described graphics driver 411, a port monitor expansion file 413, and management information like that described below with reference to FIGS. 9 and 12. Consequently, the below-described processing by a USB port monitor and print control based on the next-generation driver can be realized on next-generation architecture.

The port monitor expansion file 413 is described in the present exemplary embodiment as a file prepared for the USB port monitor 406. However, the processing that is characteristic to the exemplary embodiments of the present invention described below can also be realized by preparing an expansion file for expanding the same functions in order to perform port monitoring for the communication with the printing apparatus in another connection mode.

The constituent elements of the next-generation driver for a new OS (e.g., Windows 8 (registered trademark)) envisaged by the present invention do not include the UI module 211 included in the constituent elements of a legacy driver. Specifically, the next-generation driver cannot have a GUI for performing various settings such as a print setting. However, a GUI for performing various settings can be provided by an external application (hereinafter referred to as a next-generation application) that is supported by the below-described next-generation driver. The next-generation application and the next-generation driver are linked by information that identifies the driver.

Figure 5:
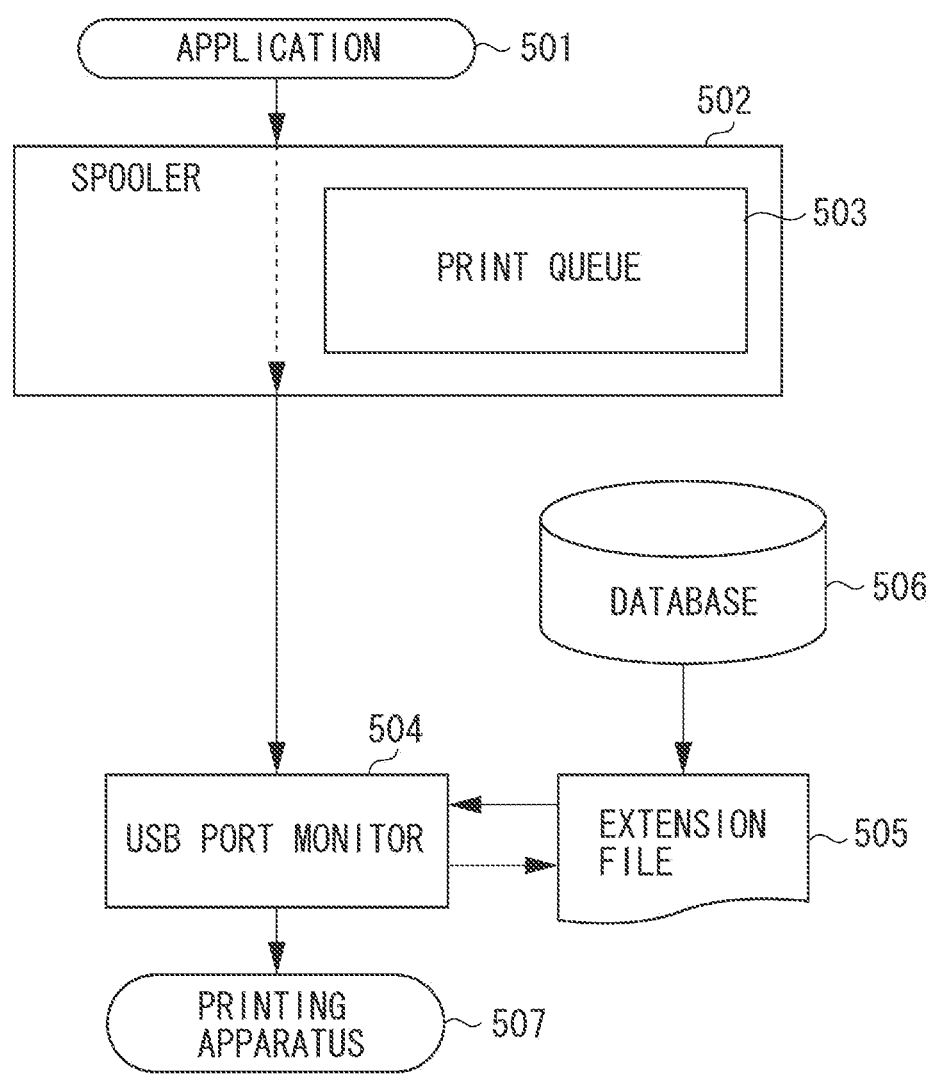
FIG. 5 illustrates the flow of maintenance processing performed by a printer driver based on next-generation architecture according to the first exemplary embodiment.

FIG. 5 illustrates the flow of maintenance processing realized in the printing system illustrated in FIG. 4.

A next-generation application 501 transmits a command identifier (ID) indicating a desired maintenance operation for a printing apparatus to a spooler 502. The spooler 502 directly transfers the received command ID to a USB port monitor 504 (hereinafter referred to as a port monitor 504) without storing the command ID in a print queue 503. Then, the port monitor 504 transfers the command ID to a port monitor expansion file 505.

The port monitor expansion file 505 is a script file for expanding OS functions that is described in JavaScript (registered trademark).

The port monitor expansion file 505 acquires a maintenance command corresponding to the received command ID by referring to a database 506 utilized by the next-generation driver. Then, the port monitor expansion file 505 instructs the port monitor 504 to transmit the acquired maintenance command to a printing apparatus 507.

In legacy architecture, as illustrated in FIG. 3, the spooler handles the maintenance command as a print job. On the other hand, in next-generation architecture, handling by the spooler 403 of the maintenance command as a print job is restricted, so that the same configuration as that in legacy architecture cannot be employed. Consequently, the processing illustrated in FIG. 5 has to be employed as a substitute method.

Figure 6A:
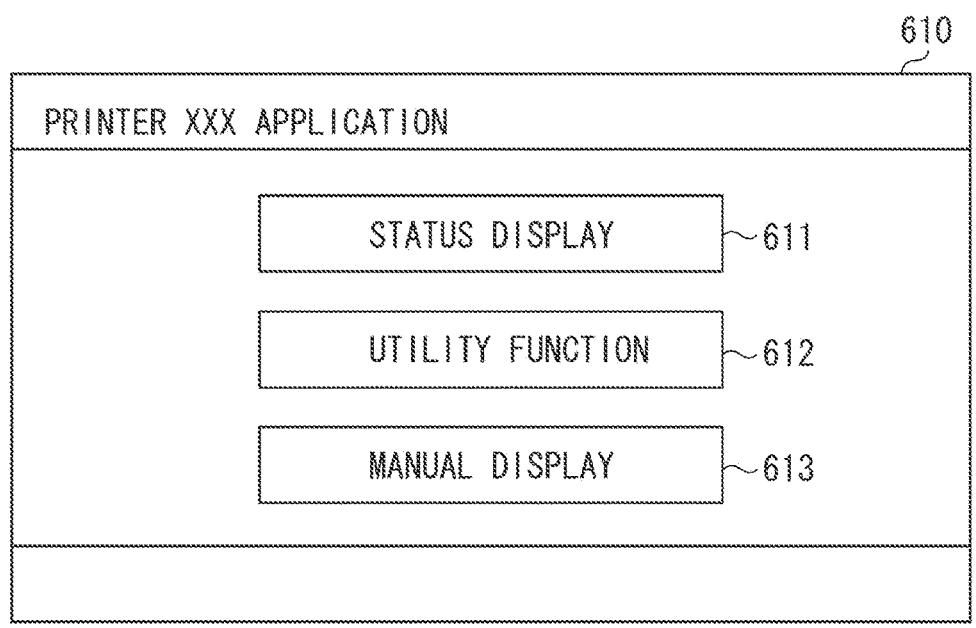
FIGS. 6A and 6B illustrate examples of a utility application UI screen based on next-generation architecture according to the first exemplary embodiment.
Figure 6B:
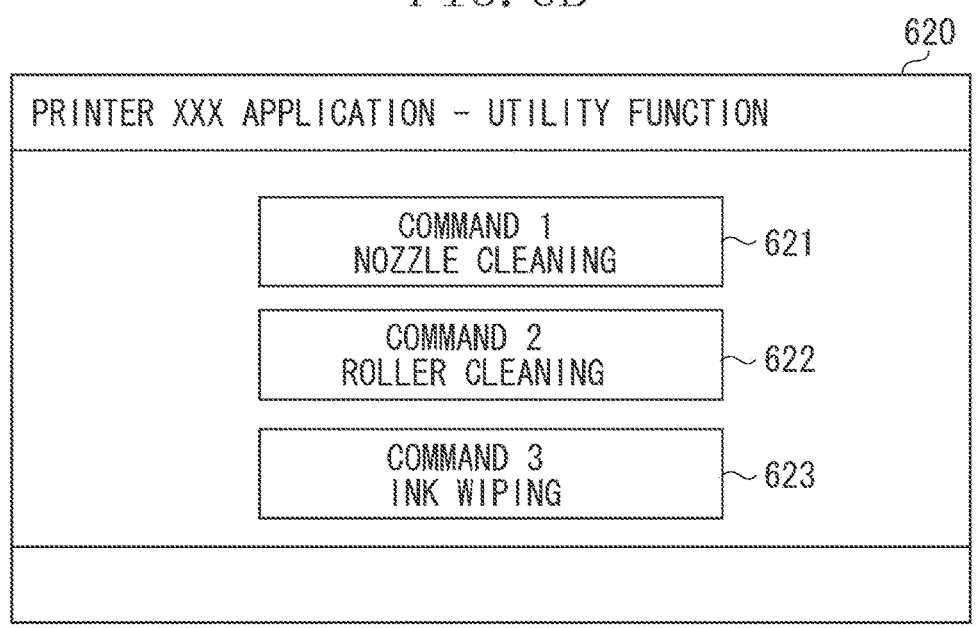

FIGS. 6A and 6B illustrate examples of a UI screen configuration of the next-generation application 501 for issuing a maintenance processing instruction to the printing apparatus 120. This application collectively provides, for example, a status display of the printing apparatus 120 and an application link (shortcut) for performing a printing related setting. Further, this application may also be provided as an application bundled with the OS.

FIG. 6A illustrates a main screen 610 that is displayed immediately after the next-generation application 501 starts. The main screen 610 includes a link button 611 to a status display screen, a link button 612 to a utility function display screen, and a link button 613 to a manual display screen. When the user selects a link button to the desired screen, the next-generation application 501 displays the screen selected by the user.

FIG. 6B illustrates a screen configuration of a utility function selection screen 620 that is displayed after the link button 612 is selected on the screen in FIG. 6A. Instruction buttons for maintenance processing, such as a nozzle cleaning button 621, a roller cleaning button 622, and an ink wiping button 622, are arranged on the screen 620. When the user selects a button relating to the maintenance desired to be executed, an instruction to execute that maintenance process is transmitted to the printing apparatus 507.

Figure 7:
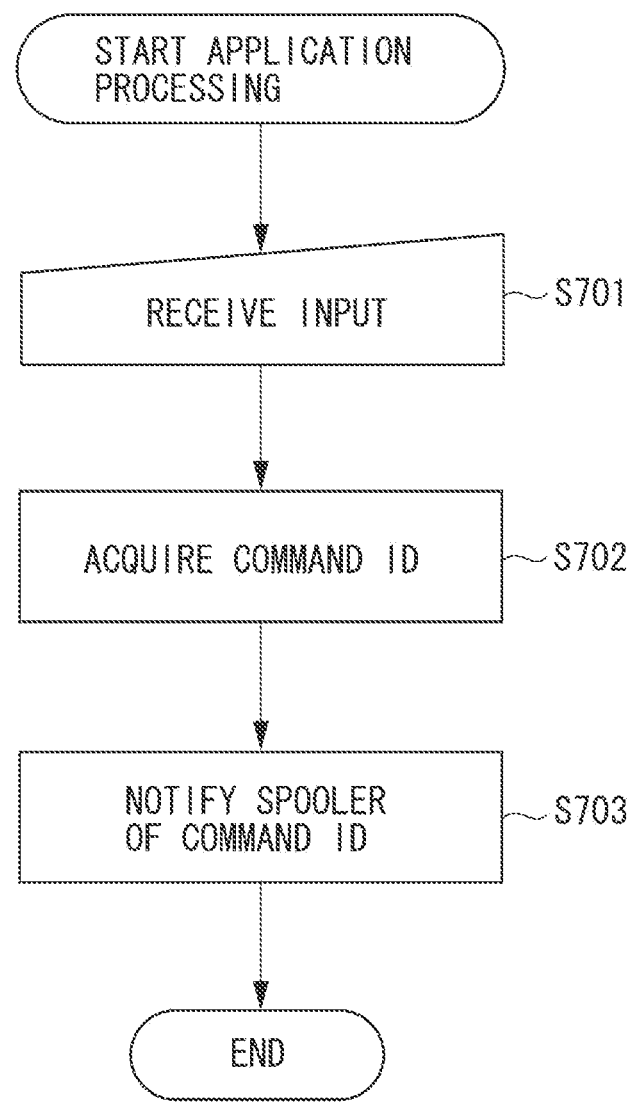
FIG. 7 is a flowchart illustrating processing of an application according to the first exemplary embodiment.

FIG. 7 is a flowchart illustrating transmission processing of a command ID performed by the next-generation application 501.

When the processing is started, in step S701, an input is received from the user via the screen 620 for selecting the above-described utility function. In step S702, the next-generation application 501 acquires the command ID corresponding to the maintenance command designated by the user, which has been specified based on the input information. In step S703, the acquired command ID is transferred to the spooler 502, and the processing is finished.

Figure 8:
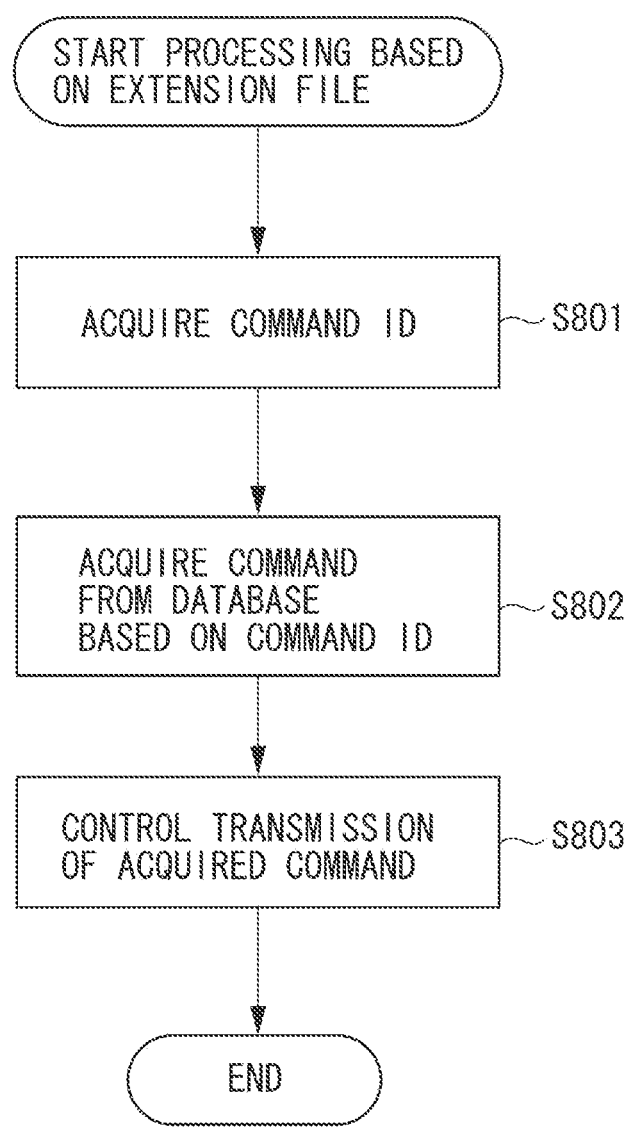
FIG. 8 is a flowchart illustrating processing based on a port monitor expansion file according to the first exemplary embodiment.

FIG. 8 is a flowchart illustrating transmission processing of a maintenance command performed by the port monitor 504 that operates based on the port monitor expansion file 505. The port monitor 504, which is a module provided by the OS, for example, executes a specific process like that illustrated in FIG. 8 by using the port monitor expansion file 505 provided by the vendor of the printing apparatus along with the next-generation driver.

In step S801, the port monitor 504 acquires the command ID via the spooler 502. In step S802, based on the port monitor expansion file 505, the port monitor 504 refers to the database 506 utilized by the next-generation driver, and acquires the maintenance command corresponding to the acquired command ID. In step S804, based on the port monitor expansion file 505, the port monitor 504 controls transmission of the acquired maintenance command to the printing apparatus 507, and then finishes the processing.

Figure 9:
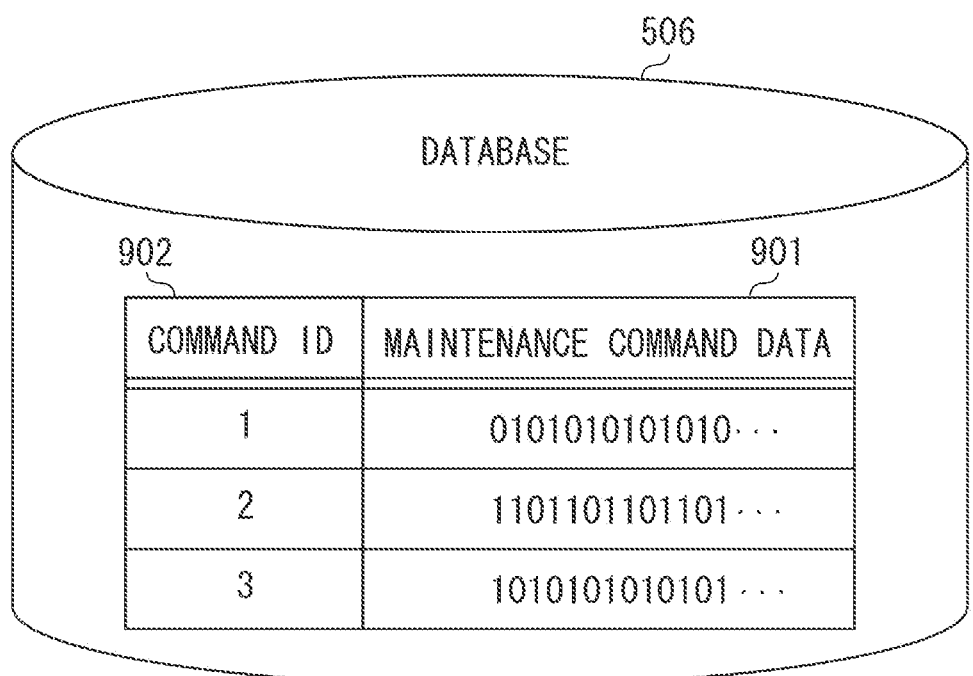
FIG. 9 illustrates maintenance command data stored in a database that is utilized by a next-generation driver according to the first exemplary embodiment.

FIG. 9 schematically illustrates maintenance command data stored in the database 506 that is utilized by the next-generation driver. Each piece of maintenance command data 901 is associated with one command ID 902, and stored in the database 506. In the port monitor expansion file 505, the processing for specifying the maintenance command to be transmitted based on the command ID by referring to the database 506 is described.

The information to be associated with the maintenance command data 901 and the command ID 902 is provided by the vendor of the printing apparatus. Further, in addition to an integer value, a character string can also be used as the command ID.

According to the above processing, even in an OS environment that is subject to a restriction which prevents a command ID from being transmitted as a print job, an instruction to execute a maintenance operation can be properly transmitted to the printing apparatus.

Further, in the present exemplary embodiment, the maintenance command itself is not directly described even if the content of the port monitor expansion file is viewed. The maintenance command is described in the database 506. This enables a greater improvement in the security of the commands themselves than if a maintenance command is stored in a port monitor expansion file, which is a text file.

A second exemplary embodiment according to the present invention will now be described with reference to FIGS. 10 to 12. In the present exemplary embodiment, the processing performed when maintenance command data corresponding to each of a plurality of models is managed by the database 506 utilizing a next-generation driver will be described. In the present exemplary embodiment, the configuration and processing flow are the same as those described with reference to FIGS. 4 and 5 in the first exemplary embodiment.

Figure 10:
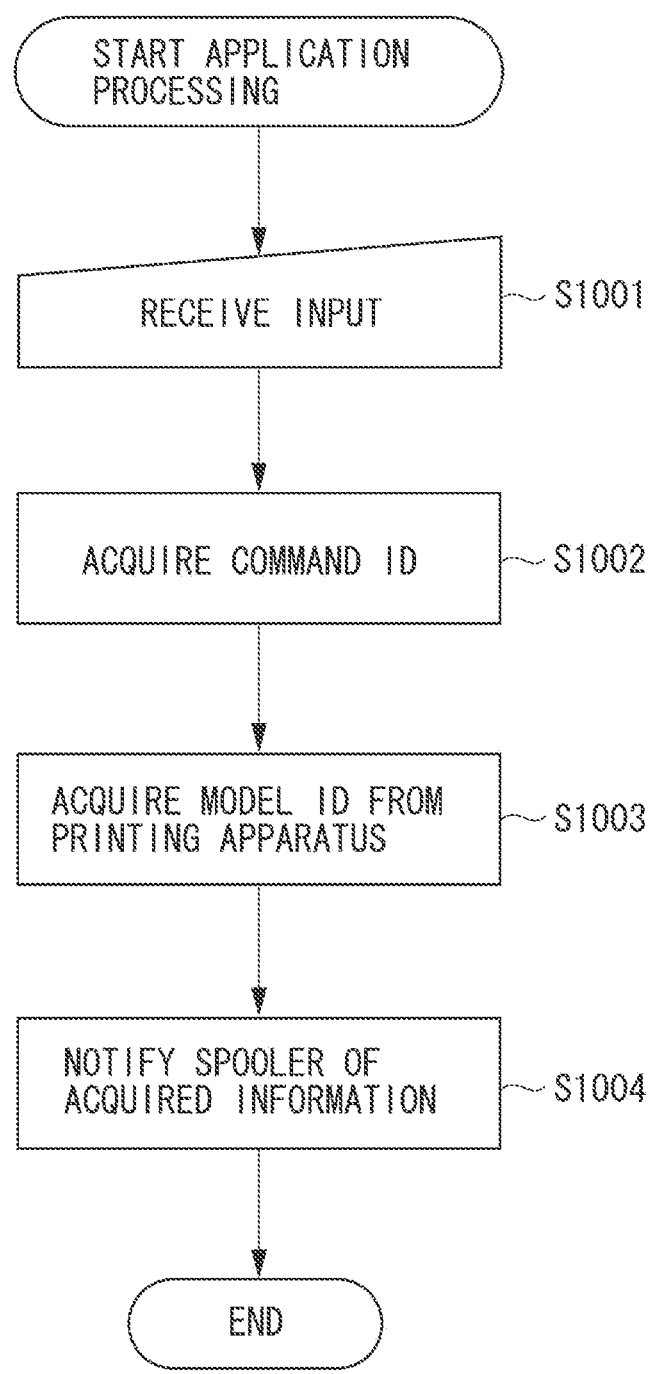
FIG. 10 is a flowchart illustrating processing of an application according to a second exemplary embodiment.

FIG. 10 is a flowchart illustrating command ID and model ID transmission processing performed by the next-generation application 501 according to the second exemplary embodiment.

When the processing is started, in step S1001, an input is received from the user via the screen 620 for selecting the above-described utility function. In step S1002, the next-generation application 501 acquires the command ID corresponding to the maintenance command designated by the user, which has been specified based on the input information. In step S1003, the next-generation application 501 transmits a request to the printing apparatus 120 connected to the information processing apparatus 110, and acquires the model ID specifying the model from the printing apparatus 120. In step S1004, the acquired command ID and model ID are transferred to the spooler 502, and the processing is finished.

In the second exemplary embodiment, to utilize a maintenance command for a specific model in the database 506 according to the below-described processing, the next-generation application 501 acquires, in addition to the command ID, the model ID from the printing apparatus. The processing order for acquiring the command ID and acquiring the model ID with the next-generation application 501 may be such that either of these is performed first. Further, in addition to the acquisition of the model ID in step S1003 from the printing apparatus, the model ID acquisition may also be realized by the user manually inputting the model ID.

Figure 11:
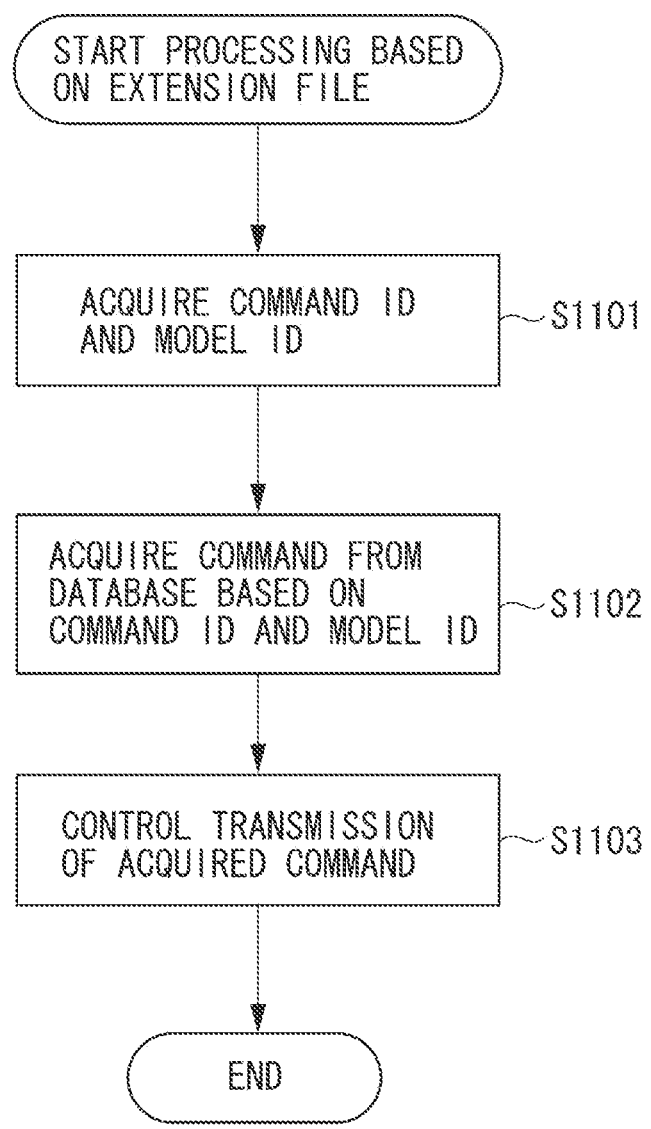
FIG. 11 is a flowchart illustrating processing based on a port monitor expansion file according to the second exemplary embodiment.

FIG. 11 is a flowchart illustrating transmission processing of a maintenance command performed by the port monitor 504 that operates based on the port monitor expansion file 505 according to the second exemplary embodiment.

In step S1101, the port monitor 504 acquires the command ID and the model ID via the spooler 502. In step S1102, based on the port monitor expansion file 505, the port monitor 504 refers to the database 506, and acquires the maintenance command corresponding to the acquired command ID and the model ID. In step S1104, based on the port monitor expansion file 505, the port monitor 504 controls transmission of the acquired maintenance command to the printing apparatus 507, and then finishes the processing.

Figure 12:
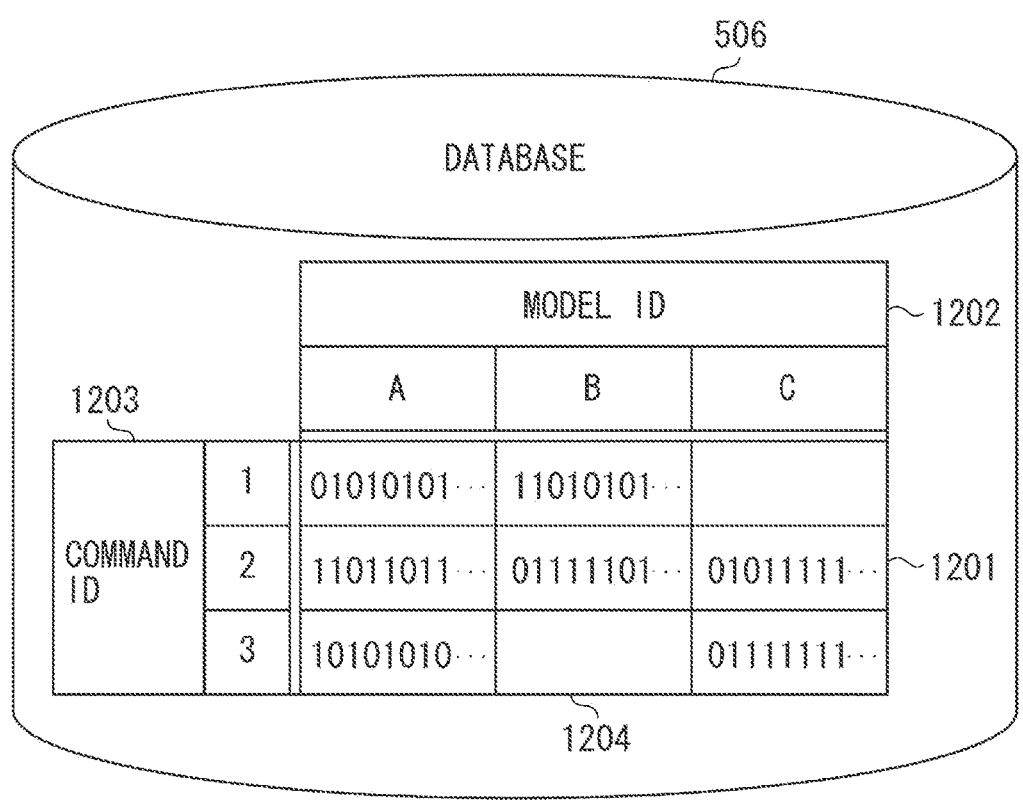
FIG. 12 illustrates maintenance command data stored in a database that is utilized by a next-generation driver according to the second exemplary embodiment.

FIG. 12 schematically illustrates maintenance command data for a plurality of models stored in the database 506 that is utilized by the next-generation driver. Each piece of maintenance command data 1201 is associated with one model ID 1202 and one command ID 1203, and stored in the database 506. In the port monitor expansion file 505, the processing for specifying the maintenance command to be transmitted according to the model ID and the command ID by referring to the database 506 is described.

The information to be associated with the maintenance command data, the model ID, and the command ID is provided by the vendor of the printing apparatus. Further, an integer value or a character string can be arbitrarily used as the model ID and the command ID.

Further, when maintenance command data for a plurality of models is stored in one database 506, a situation can arise in which the maintenance operation corresponding to each model is different. Thus, FIG. 12 illustrates the fact that a maintenance operation is not supported by some model by leaving the relevant entry blank. For example, FIG. 12 illustrates that the model corresponding to model ID "B" does not support the maintenance command represented by command ID "3" by leaving the entry in this column blank. Although FIG. 12 indicates that a command is not supported by leaving the entry blank, this can also be indicated using reserved characters, such as "None" for example.

According to the above processing, based on consideration of the model, an instruction to execute a maintenance operation can be properly transmitted to the printing apparatus even in an OS environment that is subject to a restriction which prevents a command ID from being transmitted as a print job.

A third exemplary embodiment according to the present invention will now be described with reference to FIGS. 13 and 14. The present exemplary embodiment is an expansion of the second exemplary embodiment, with the configuration and the processing content being almost the same. The difference is that a determination is made regarding whether the maintenance command data stored in the database 506 corresponds to a plurality of models, and the subsequent processing is changed depending on that determination.

Figure 13:
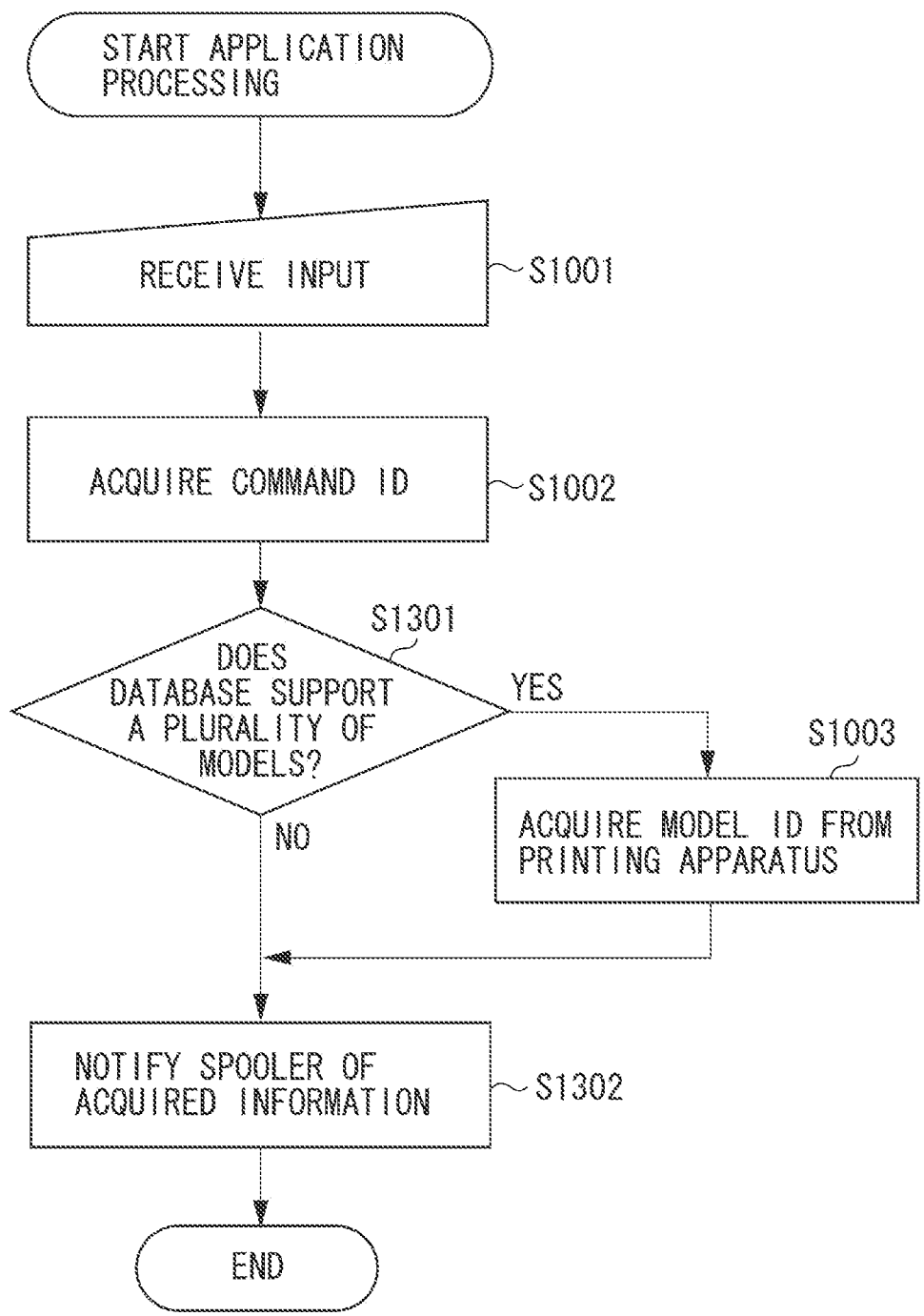
FIG. 13 is a flowchart illustrating processing of an application according to a third exemplary embodiment.

FIG. 13 is a flowchart illustrating transmission processing of the command ID and model ID performed by the next-generation application 501 according to the third exemplary embodiment. Processing that is the same as illustrated FIG. 10 is denoted with the same reference numerals, and a description of that processing will be omitted here.

In step S1301, the next-generation application 501 determines whether the database 506 supports a plurality of models. This determination is made by storing, in advance in the database 506, information regarding whether maintenance command data for a plurality of models is stored, and having the application refer to that information. If it is determined in step S1301 that the database 506 supports a plurality of models (YES in step S1301), the processing proceeds to step S1003. Then, in step S1302, the information (the command ID only, or the command ID and model ID) is transferred to the spooler 502, and the processing is finished.

The determination performed in step S1301 is not limited to this example. For example, the determination may also be performed by providing the information about the plurality of models with a naming convention in the database 506, and performing the determination according to file names.

Figure 14:
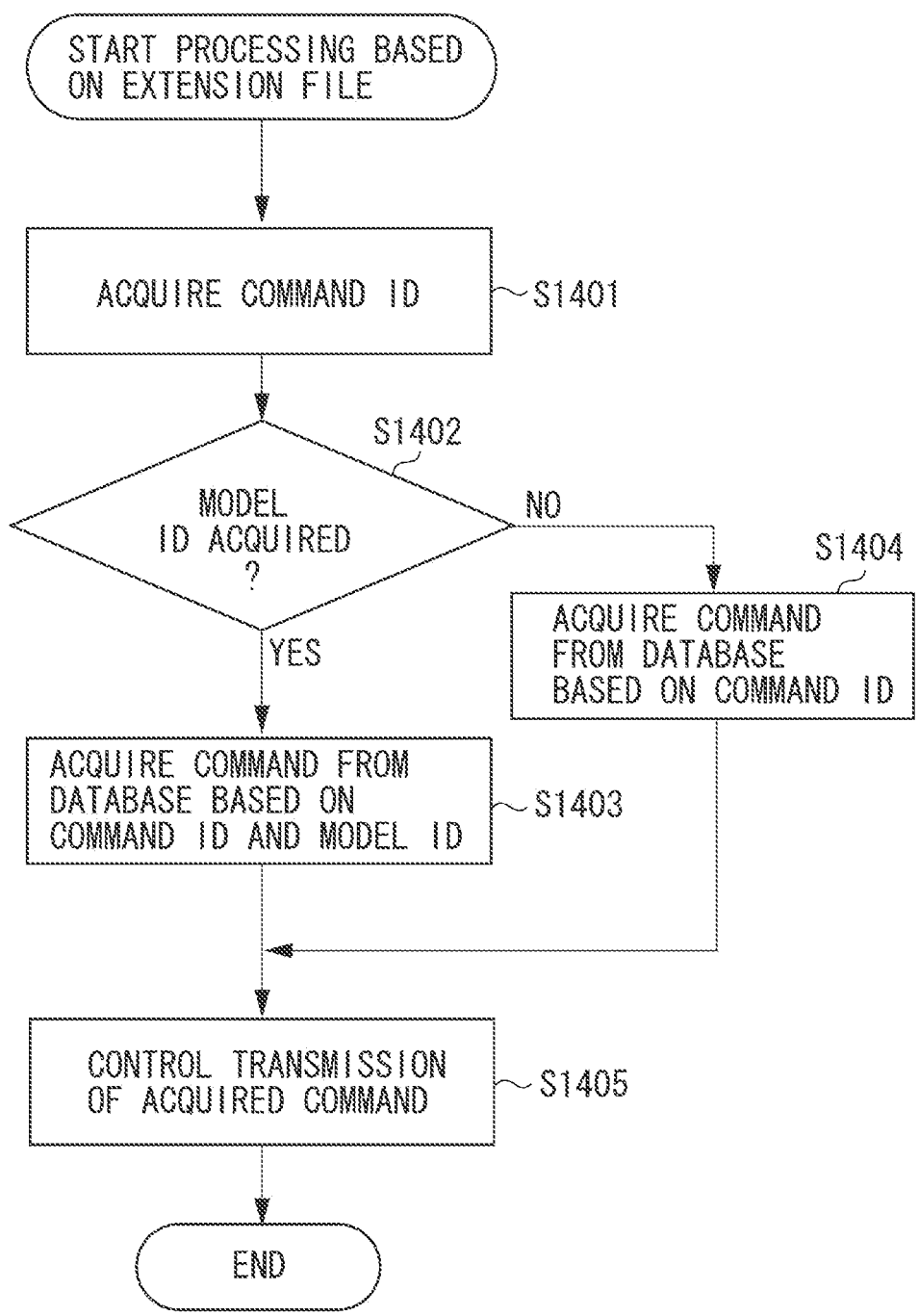
FIG. 14 is a flowchart illustrating processing based on a port monitor expansion file according to the third exemplary embodiment.

FIG. 14 is a flowchart illustrating maintenance command transmission processing performed by the port monitor 504 that operates based on the port monitor expansion file 505 according to the third exemplary embodiment.

In step S1401, the port monitor 504 acquires the command ID via the spooler 502. In step S1402, the port monitor 504 determines whether a model ID has been acquired via the spooler 502. If it is determined that a model ID has been acquired (YES in step S1402), then in step S1403, based on the port monitor expansion file 505, the port monitor 504 refers to the database 506, and acquires the maintenance command corresponding to the acquired command ID and the model ID. On the other hand, if it is determined in step S1402 that a model ID has not been acquired (NO in step S1402), then in step S1404, the port monitor 504, based on the port monitor expansion file 505, refers to the database 506 and acquires the corresponding maintenance command only according to the command ID. Then, in step S1405, based on the port monitor expansion file 505, the port monitor 504 controls transmission of the acquired maintenance command to the printing apparatus 507, and then finishes the processing.

A fourth exemplary embodiment according to the present invention will now be described with reference to FIGS. 15 and 16. The present exemplary embodiment relates to, in maintenance execution processing, processing that is performed when the port monitor 504 fails to acquire a maintenance command from the database 506. As stated above, since the next-generation driver does not have a GUI screen display function, the user cannot be notified that the maintenance command fails to be acquired in response to an input by the user of a maintenance execution instruction via the screen 620 for selecting the above-described utility function. In the present exemplary embodiment, exception processing that considers this point will be described in detail.

Figure 15:
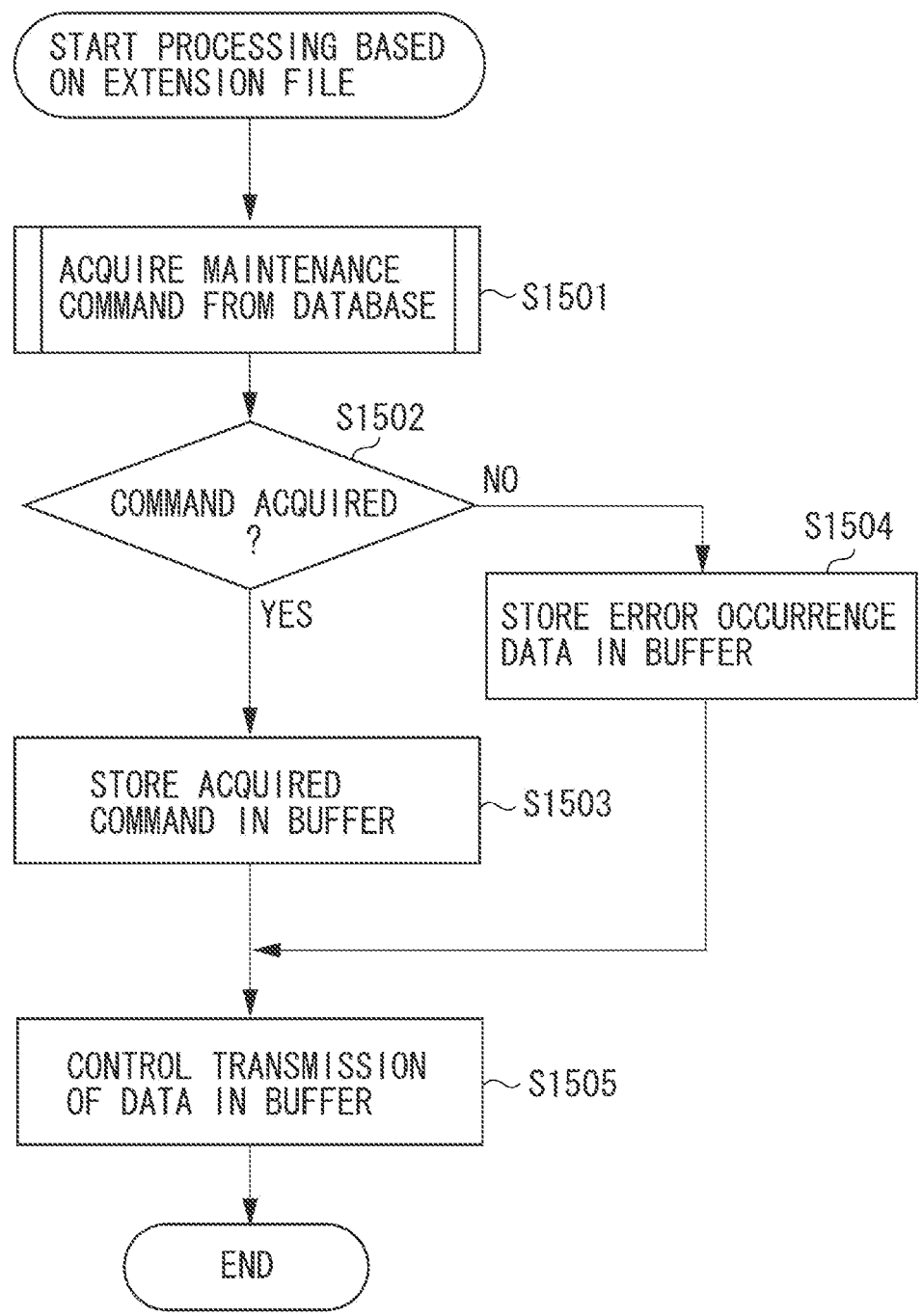
FIG. 15 is a flowchart illustrating processing based on a port monitor expansion file according to a fourth exemplary embodiment.

FIG. 15 is a flowchart illustrating maintenance command transmission processing performed by the port monitor 504 that operates based on the port monitor expansion file 505 according to the fourth exemplary embodiment.

In step S1501, the port monitor 504 executes processing to acquire a maintenance command from the database 506. Specifically, the port monitor 504 executes the processing described in one of the above first to third exemplary embodiments. Next, in step S1502, the port monitor 504 determines whether a maintenance command has been acquired. If it is determined that a maintenance command has been acquired (YES in step S1502), the processing proceeds to step S1503. If it is determined that a maintenance command has not been acquired (NO in step S1502), the processing proceeds to step S1504.

In step S1503, the port monitor 504 stores the acquired maintenance command in a transmission buffer. On the other hand, in step S1504, instead of a maintenance command, the port monitor 504 stores error occurrence data in the transmission buffer. Then, in step S1505, the port monitor 504 controls transmission of the information in the buffer to the printing apparatus 507, and then finishes the processing.

Figure 16:
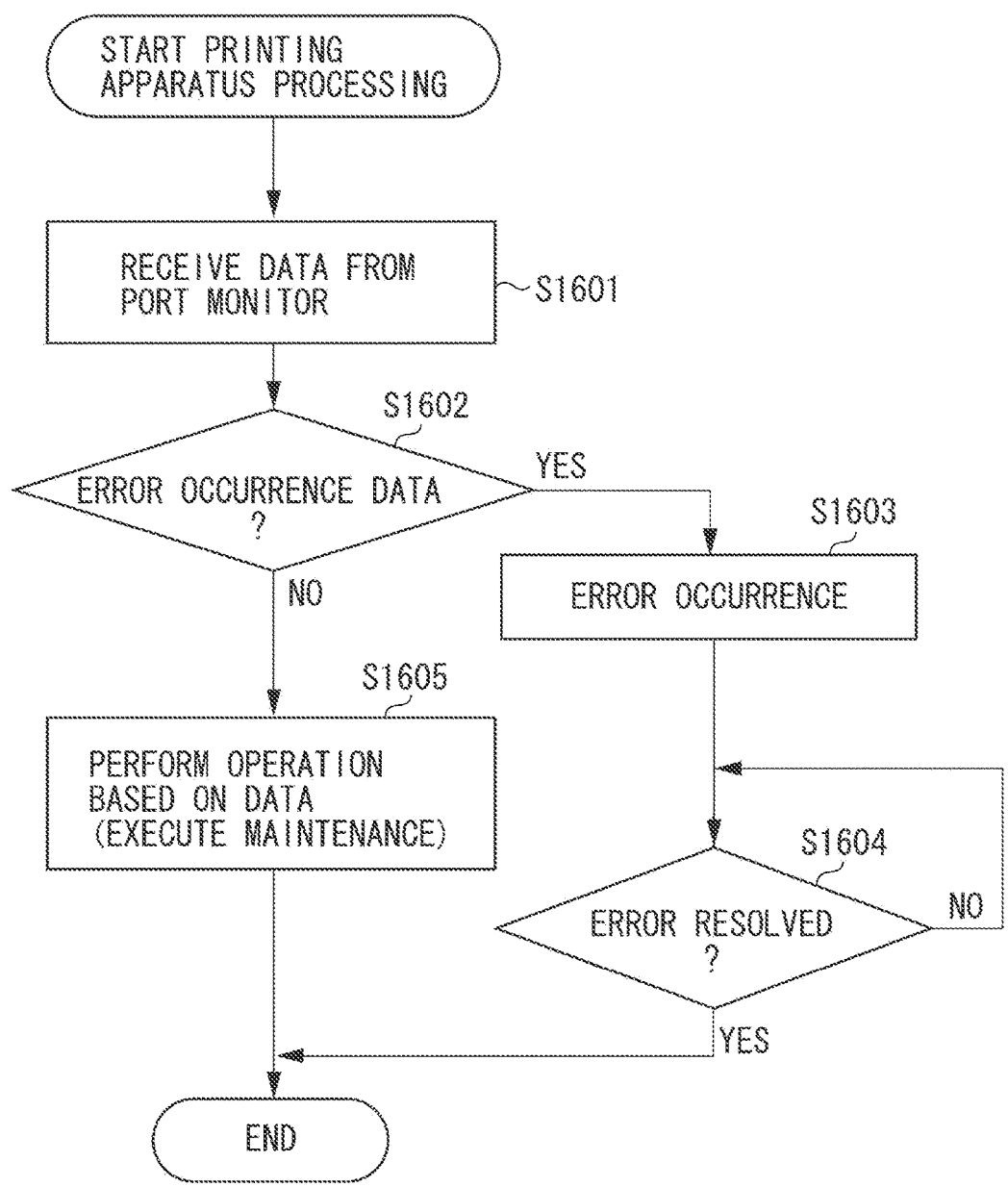
FIG. 16 is a flowchart illustrating processing performed by a printing apparatus according to the fourth exemplary embodiment.

FIG. 16 is a flowchart illustrating operation of the printing apparatus 120 that received the data transmitted from the port monitor 504 in FIG. 15.

In step S1601, the printing apparatus 120 receives the data transmitted from the port monitor 504. In step S1602, the printing apparatus 120 determines whether the received data is error occurrence data. If it is determined that the received data is error occurrence data (YES in step S1602), the processing proceeds to step S1603. If it is determined that the received data is not error occurrence data (NO in step S1602), the processing proceeds to step S1605.

In step S1603, the printing apparatus 507 transitions to an error state according to the error occurrence data. At this timing, the fact that an error has occurred in the printing apparatus is notified to the user by an error output via an operation unit in the printing apparatus or a network. Errors according to specific error occurrence data may also be notified by issuing a message that maintenance execution failed. In step S1604, the error processing continues until the error state is resolved. An example of a way to resolve the error state is to provide an error resolution button in the printing apparatus 507, so that error state of the printing apparatus 507 is resolved when the user presses the button. In step S1605, the printing apparatus 507 executes processing according to the received data. In this example, an operation is executed according to the maintenance command data. After this, the processing is finished.

According to the above exemplary embodiment, when maintenance cannot be executed due to reasons such as failure to acquire a maintenance command, the user can be notified of that error even when utilizing the next-generation driver that does not have the above-described UI module.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An information processing apparatus comprising:
at least one processor; and
at least one memory storing:
a printer driver that generates, based on print data generated by a first application in the information processing apparatus, a print command to be output to and interpreted by a printer, wherein the printer driver does not have a function for providing a graphical user interface (GUI) for receiving a user instruction to input a print setting,
a second application external from and linked with the printer driver via identification information and external from the first application, the second application, when executed by the at least one processor, operates to:
provide a first GUI for receiving a first user instruction to input a print setting which is output by the second application and is to be applied by the printer driver to the generated print data when the printer driver generates the print command to be output to and interpreted by the printer, the output print command causing the printer to perform printing,
cause a second GUI to be displayed for receiving a second user instruction; and
wherein a third GUI for receiving a third user instruction to select maintenance processing to be performed on the printer is displayed based on the second user instruction being received in the second GUI,
wherein the information processing apparatus instructs the maintenance processing selected by the third user instruction to be performed on the printer by transmitting identifier data indicating the selected maintenance processing to the printer.

2. The information processing apparatus according to claim 1, wherein the second GUI has a button to the third GUI.

3. The information processing apparatus according to claim 1, wherein the third GUI is a screen for selecting a content of maintenance processing to be executed on the printer.

4. The information processing apparatus according to claim 1, wherein the maintenance processing includes cleaning.

5. The information processing apparatus according to claim 1, wherein a status of the printer is displayed in the second GUI.

6. The information processing apparatus according to claim 1, wherein the printer driver does not have a module for providing the first GUI.

7. The information processing apparatus according to claim 1, wherein the second application does not modify a program of the printer driver.

8. The information processing apparatus according to claim 1, wherein the second application provides the third GUI for receiving the third user instruction.

9. A method for controlling an information processing apparatus in which a printer driver is stored in a memory, the printer driver being configured to, based on print data generated by a first application in the information processing apparatus, generate a print command to be output to and interpreted by a printer, the printer driver not having a function for providing a graphical user interface (GUI) for receiving a user instruction to input a print setting, the method comprising:

provided, by a second application external from and linked with the printer driver via identification information and external from the first application, a first GUI for receiving a first user instruction to input a print setting which is output by the second application and is to be applied by the printer driver to the generated print data when the printer driver generates the print command to be output to and interpreted by the printer, the output print command causing the printer to perform printing; and causing a second GUI to be displayed for receiving a second user instruction;

wherein based on the second user instruction being received in the second GUI, a third GUI for receiving a third user instruction to select maintenance processing to be performed on the printer is displayed, wherein the information processing apparatus instructs the maintenance processing selected by the third user instruction to be performed on the printer by transmitting identifier data indicating the selected maintenance processing to the printer, and the method is implemented by one or more processors.

10. The method according to claim 9, wherein the second GUI has a button to the third GUI.

11. The method according to claim 9, wherein the second GUI is a screen for selecting a content of maintenance processing to be executed on the printer.

12. The method according to claim 9, wherein the maintenance processing includes cleaning.

13. The method according to claim 9, wherein a status of the printer is displayed on the second GUI.

14. The method according to claim 9, wherein the printer driver does not have a module for providing the first GUI.

15. The method according to claim 9, wherein the second application does not modify a program of the printer driver.

16. The method according to claim 9, wherein the second application provides the third GUI for receiving the third user instruction.

17. A method for controlling an information processing apparatus in which a printer driver is stored in a memory, the printer driver being configured to, based on print data generated by a first application in the information processing apparatus, generate a print command to be output to and interpreted by a printer, the printer driver including an expansion file for expanding a function of a USB port monitor, the method comprising:

providing, by a second application external from and linked with the printer driver via identification information and external from the first application, a first GUI for receiving a first user instruction to input a print setting which is output by the second application and is to be applied by the printer driver to the generated print data when the printer driver generates the print command to be output to and interpreted by the printer, the output printing command causing the printer to perform printing; and causing a second GUI to be displayed for receiving a second user instruction;

wherein based on the second user instruction being received in the second GUI, a third GUI for receiving a third user instruction to select maintenance processing to be performed on the printer is displayed, wherein the information processing apparatus instructs the maintenance processing selected by the third user instruction to be performed on the printer by transmitting identifier data indicating the selected maintenance processing to the printer, and the method is implemented by one or more processors.

18. The method according to claim 17, wherein the second GUI screen has a button to the third GUI.

19. The method according to claim 17, wherein the second GUI is a screen for selecting a content of maintenance processing to be executed on the printer.

20. The method according to claim 17, wherein the maintenance processing includes cleaning.

21. The method according to claim 17, wherein a status of the printer is displayed in the second GUI.

22. The method according to claim 17, wherein the expansion file is a script file described in JavaScript.

23. The method according to claim 17, wherein the second application does not modify a program of the printer driver.

24. The method according to claim 17, wherein the second application provides the third GUI for receiving the third user instruction.

* * * * *